US006675229B1

(12) United States Patent
Bruno et al.

(10) Patent No.: US 6,675,229 B1
(45) Date of Patent: Jan. 6, 2004

(54) METHODS AND APPARATUS FOR PROVIDING QUALITY OF SERVICE FOR LEGACY APPLICATIONS

(75) Inventors: John Louis Bruno, Davis, CA (US); José Carlos Brustoloni, Chatham, NJ (US); Eran Gabber, Summit, NJ (US); Banu Ozden, Summit, NJ (US); Abraham Silberschatz, Warren, NJ (US); Amit Singh, Mountain View, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/450,036

(22) Filed: Nov. 29, 1999

(51) Int. Cl.[7] .................................................. G06F 9/54
(52) U.S. Cl. ........................ 709/328; 709/331; 709/104
(58) Field of Search ................................ 709/100–108, 709/311–320, 328–332; 717/126–133

(56) References Cited

U.S. PATENT DOCUMENTS

| 6,189,046 | B1 | * | 2/2001 | Moore et al. | 709/315 |
| 6,289,462 | B1 | * | 9/2001 | McNabb et al. | 713/201 |
| 6,385,638 | B1 | * | 5/2002 | Baker-Harvey | 709/107 |
| 6,408,342 | B1 | * | 6/2002 | Moore et al. | 709/330 |
| 6,442,748 | B1 | * | 8/2002 | Bowman-Amuah | 717/3 |

OTHER PUBLICATIONS

I. Stoica et al., "A Proportional Share Resource Allocation Algorithm for Real–Time, Time–Shared Systems," in Proceedings of Real Time Systems Symp., IEEE, pp. 1–12, Dec. 1996.

D. Stiliadis et al., "Frame–Based Fair Queuing: A New Traffic Scheduling Algorithm for Packet–Switched Networks," Tech. Rep. UCSC–CRL–95–39, Univ. Calif. Santa Cruz, pp. 1–41, Jul. 1995.
J. Mogul et al., "Eliminating Receive Livelock in an Interrupt–driven Kernel," in Proceedings of Annual Tech. Conf., USENIX, pp. i–viii and 1–46, 1996.
J. Bruno et al., "The Eclipse Operating System: Providing Quality of Service via Reservation Domains," in Proceedings of Annual Tech. Conf., USENIX, pp. 235–246, Jun. 1998.
J. Bennet et al., "$WF^2Q$: Worst–Case Fair Weighted Fair Queueing," in Proceedings of INFOCOM'96, IEEE, pp. 120–128, Mar. 1996.
J. Bennet et al., "Hierarchical Packet Fair Queueing Algorithms," in Proceedings of SIGCOMM'96, ACM, 7 pages, Aug. 1996.
P. Goyal et al., "A Hierarchical CPU Scheduler for Multimedia Operating Systems," in Proceedings of OSDI'96, USENIX, pp. 107–121, Oct. 1996.

(List continued on next page.)

Primary Examiner—St. John Courtenay, III (57) ABSTRACT

A computer operating system that allows legacy applications to be run automatically with quality of service (QoS) guarantees matching required QoS performance levels. In accordance with the invention, files have QoS requirement attributes that can be set-by users. Additionally, users may interpose a requirement broker between a given legacy application and the operating system. The requirement broker may be in the form of a modified version of a library that is dynamically linked with applications at load time. The requirement broker intercepts certain system calls and automatically requests from the system QoS guarantees in accordance with the QoS requirement attributes of the accessed files, whether local or remote.

25 Claims, 7 Drawing Sheets

OTHER PUBLICATIONS

J. Bruno, et al., "Disk Scheduling with Quality of Service Guarantees," in Proceedings of ICMCS'99, IEEE, 3 pages, Jun. 1999.

P. Druschel et al., "Lazy Receiver Processing (LRP): A Network Subsystem Architecture for Server Systems," in Proceedings of OSDI'96, USENIX, pp. 261–275, Oct. 1996.

D. Ghormley et al., "SLIC: An Extensibility System for Commodity Operating Systems," in Proceedings of Annual Tech. Conf., USENIX, 15 pages, Jun. 1998.

P. Goyal et al., "Start–Time Fair Queuing: A Scheduling Algorithm for Integrated Services Packet Switching Networks," in Proceedings of SIGCOMM'96, ACM, pp. 1–14, Aug. 1996.

M. Jones et al., "CPU Reservations and Time Constraints: Efficient, Predictable Scheduling of Independent Activities," in Proceedings of SOSP'97, ACM, pp. 198–211, Oct. 1997.

J. Nieh, "The Design, Implementation and Evaluation of SMART: A Scheduler for Multimedia Applications," in Proceedings of SOSP'97, ACM, pp. 184–197, Oct. 1997.

P. J. Shenoy et al., "Cello: A Disk Scheduling Framework for Next Generation Operating Systems," in Proceedings of SIGMETRICS'98, ACM, 6 pages, Jun. 1998.

G. Banga et al., "Resource Containers: A New Facility for Resource Management in Server Systems," in Proceedings of OSDI'99, USENIX, pp. 45–58, Feb. 1999.

B.D. Noble et al., "Agile Application–Aware Adaptation for Mobility," in Proceedings of SOSP'97, ACM, 6 pages, 1997.

G. Banga et al., "Better Operating System Features for Faster Network Servers," in Proceedings of Workshop on Internet Server Performance, 6 pages, Jun. 1998.

* cited by examiner-

METHODS AND APPARATUS FOR PROVIDING QUALITY OF SERVICE FOR LEGACY APPLICATIONS

RELATED APPLICATION

The present invention is related to the invention described in the U.S. patent application of J. Bruno et al., entitled "Methods and Apparatus for Ensuring Quality of Service in an Operating System," which is filed concurrently herewith and incorporated by reference herein.

FIELD OF THE INVENTION

The present invention relates generally to computer systems, and more particularly to techniques for providing a desired quality of service (QoS) for an application running in a computer system.

BACKGROUND OF THE INVENTION

Conventional time-sharing operating systems cannot guarantee resource availability in the amount required by any given application. Examples of conventional time-sharing operating systems include Unix, as described in, e.g., M. McKusick et al., "The Design and Implementation of the 4.4 BSD Operating System," Addison Wesley Pub. Co., Reading, Mass., 1996, and Windows NT, as described in, e.g., H. Custer, "Inside Windows NT," Microsoft Press, 1993.

However, an increasing number of applications, e.g., multimedia, require sufficient resources, including central processing unit (CPU), memory, and disk and network bandwidth, in order to perform properly. Such applications may perform well, on conventional time-sharing operating systems in cases of overprovisioning, i.e., when the total amount of resources tends to be larger than a worst-case workload would demand. Overprovisioning is possible, e.g., on dedicated systems, in the absence of other load. On the other hand, conventional time-sharing operating systems cannot guarantee adequate performance of such applications, e.g., in the cases of server "hot spots" or network congestion.

For such applications to perform properly under arbitrary load, an operating system must provide quality of service (QoS) guarantees and admission control, i.e., the operating system should admit a request only if the system has set aside sufficient resources to guarantee that it will satisfy the request with the specified performance bounds. Many techniques for providing QoS guarantees have been developed recently, as described, e.g., in D. Stiliadis and A. Varma, "Frame-Based Fair Queuing: A New Traffic Scheduling Algorithm for Packet-Switched Networks," Tech. Rep. UCSC-CRL-95-39, Univ. Calif. Santa Cruz, July 1995; J. Bennett and H. Zhang, "$WF_2Q$: Worst-Case Fair Weighted Fair Queueing," in Proceedings of INFOCOM'96, IEEE, March 1996, pp. 120–128; J. Bennett and H. Zhang, "Hierarchical Packet Fair Queueing Algorithms," in Proceedings of SIGCOMM'96, ACM, August 1996; P. Goyal, X. Gao and H. Vin, "A Hierarchical CPU Scheduler for Multimedia Operating Systems," in Proceedings of OSDI'96, USENIX, October 1996, pp. 107–121; and I. Stoica, H. Abdel-Wahab, K. Jeffay, S. Baruah, J. Gehrke and C. G. Plaxton, "A Proportional Share Resource Allocation Algorithm for Real-Time, Time-Shared Systems," in Proceedings of Real Time Systems Symp., IEEE, December 1996.

A major shortcoming of these and other QoS techniques is that they typically require legacy applications to be modified in order to benefit from the improved guarantees that can be provided by the QoS techniques. Legacy applications are those developed before a given QoS technique. Modifying legacy applications can be costly or impractical.

SUMMARY OF THE INVENTION

The present invention provides techniques for running legacy applications automatically with quality of service (QoS) guarantees that match required QoS performance levels. In accordance with the invention, files are provided with a new attribute, referred to herein as a QoS requirement, and a requirement broker is interposed between legacy applications and the operating system. The requirement broker may be in the form of a modified version of a library that is dynamically linked with applications at load time. The modified library intercepts certain system calls and automatically requests QoS guarantees in accordance with the QoS requirement attributes of the accessed files, whether local or remote.

Advantageously, the invention allows an operating system to run unmodified legacy applications automatically with QoS guarantees that provide the required performance.

DETAILED DESCRIPTION OF THE INVENTION

The present invention will be illustrated below in conjunction with exemplary techniques for guaranteeing quality of service (QoS) for applications in an operating system. It should be understood, however, that the invention is not limited to use with any particular type of computer system or computer system configuration, but is instead more generally applicable to any type or configuration of computer system in which it is desirable to provide improved QoS performance without unduly increasing system complexity or without modifying legacy applications. For example, although illustrated below in the context of two operating systems derived from 4.4 Berkeley Software Distribution (BSD) Unix (FreeBSD and Eclipse/BSD), the techniques of the invention can also be applied to other operating systems, including other Unix-derived operating systems and Windows NT.

The invention provides techniques for ensuring QoS guarantees for legacy applications. An illustrative embodiment of the invention is implemented in an operating system referred to herein as "Eclipse/BSD." Eclipse/BSD is derived from the FreeBSD operating system. Additional details regarding the Eclipse/BSD operating system are described in the above-cited U.S. patent application of J. Bruno et al., entitled "Methods and Apparatus for Ensuring Quality of Service in an Operating System."

The Eclipse/BSD hierarchical resource management model, and its implementation in the FreeBSD operating system, will now be described in detail. Eclipse/BSD applications obtain a desired QoS by initially acquiring a resource reservation for each required physical resource. Physical resources include CPU, memory, disks, and network interfaces, each managed by a scheduler. A resource reservation specifies a fraction of the resource set aside for exclusive use by one or more processes. Applications can subdivide resource reservations hierarchically. Admission control guarantees that reservations do not exceed resources. As will be described in greater detail below, Eclipse/BSD's schedulers share fractions of the respective resource fairly among all applications currently using the resource.

Figure 1:
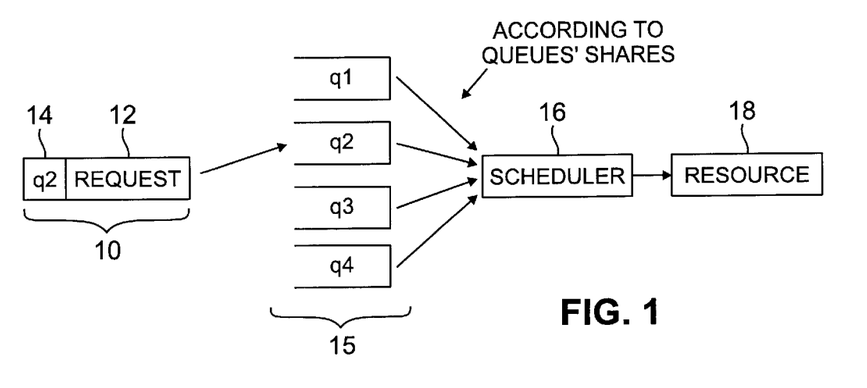
FIG. 1 illustrates the manner in which requests are tagged with a queue identifier and a proportional-share scheduler apportions resources to the requests in each queue in proportion to the queue's share in an Eclipse/BSD operating system in the illustrative embodiment of the invention.

FIG. 1 illustrates request processing in the illustrative embodiment of the invention. Every request arriving at a given one of the above-noted schedulers must specify a queue, and the given scheduler apportions resources to each queue based on the queue's. share of that resource. In the FIG. 1 example, a particular request 10 includes the request information 12 along with an identifier 14 of the particular queue to which the request will be directed. A set of queues 15 includes four queues, q1, q2, q3 and q4 as shown. A scheduler 16 submits the requests from the queues 15 to a resource 18 according to the queues' shares of that resource.

Figure 2:
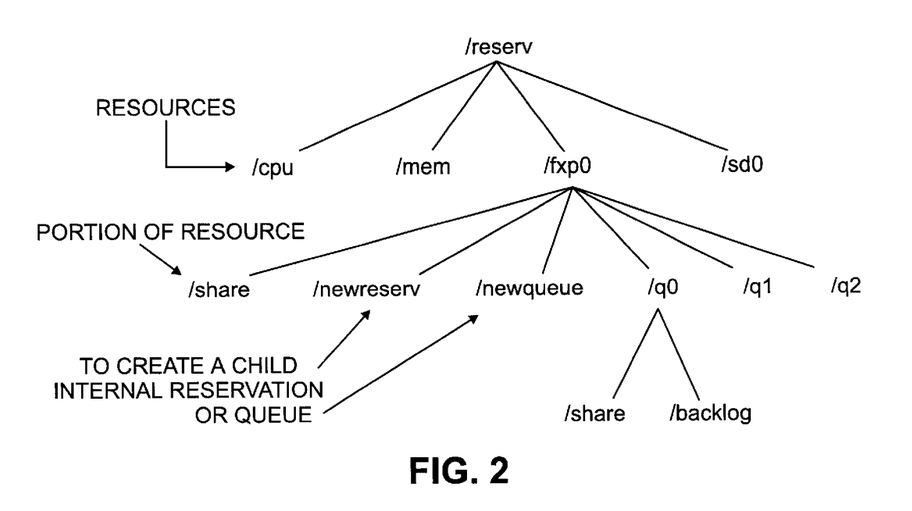
FIG. 2 shows an example of a file system that allows applications to create hierarchical resource reservations in the Eclipse/BSD operating system in the illustrative embodiment of the invention.

Applications specify resource reservations as directories in a file system referred to as /reserv. FIG. 2 illustrates an example of the /reserv file system. Each independently scheduled resource in the corresponding computer system corresponds to a directory under /reserv, e.g., /reserv/cpu (CPU), /reserv/mem (physical memory), /reserv/fxp0 (network interface 0), /reserv/sd0 (disk 0), etc., as shown in FIG. 2. Devices with multiple independently-scheduled resources generally correspond to multiple directories, whereas multiple jointly-scheduled resources, e.g., mirrored disks, correspond to a single directory.

A given resource reservation r is called an internal reservation if it can have children, or a queue if it cannot have children. The parent p of a given resource reservation r is always either /reserv or another reservation for the same resource. Each resource reservation r in the illustrative embodiment contains a share file that specifies two values: $m_r$, the minimum absolute value of the resources that r obtains from p, and $\phi_r$ the weight with which r shares p's resources. The value $m_r$ is specified in units appropriate to the respective resource, e.g., SPECint95 for CPU, bytes for physical memory, or Kbps for disk or network interfaces. If p is /reserv, $m_r=V$, the entirety of the resource, and $\phi_r$ is 100%. Writes to share files may fail due to admission control. A new command to the fcntl system call, $F_{13}$ SHARE_WAIT, allows a process to block until the previously failed write to a share file may succeed if retried. The amount of resources apportioned to a reservation r, $v_r$, depends dynamically on what reservations are actually being used. Every request arriving at a scheduler must specify a queue for processing that request; the request is said to use that queue. Schedulers enqueue and service in first-in, first-out (FIFO) order requests that use the same queue. A reservation r is said to be "busy" while there is at least one request that uses r or a descendent of r.

If a resource reservation r is internal, then it also contains the files newreserv and newqueue. By opening either of these files, an application creates an internal reservation or queue, respectively, that is r's child. The open call returns the file descriptor of the newly created share file, initialized with $m_r=0$ and $\phi_r=0$. Internal reservations thus created are consecutively numbered r0, r1, and so on, whereas queues are numbered q0, q1, and so on.

If resource reservation r is a queue, then it also contains the file backlog. Writing into backlog clears the number of requests served and the amount of service provided and sets the maximum number of requests and the amount of service that may concurrently be waiting in the queue. Reading from backlog returns the number of requests served and the amount of service provided, in units appropriate to the respective resource, e.g. CPU time or bytes.

The resource reservations each process is allowed to create or use will now be described. In Eclipse/BSD, a process P's reservation domain is a list of internal reservations, each called a root reservation, one for each resource. Queue q0of process P's root reservation r is called P's default queue for the respective resource. A process P can list any directory under /reserv and open and read any share or backlog file, but can write on share or backlog files or open newreserv or newqueue files (i.e., create children) only in reservations that are equal to or descend from one of P's root reservations.

The reservation domain of a process pid is represented by a new read-only file, /proc/pid/rdom, added to FreeBSD's proc file system (where rdom stands for "reservation domain"). For example, /proc/103/rdom could contain:

/reserv/cpu/r2 /reserv/mem/r1

/reserv/fxp0/r0 /reserv/sd0/r3 meaning that process 103 has root CPU reservation r2, root memory reservation r1, root network reservation r0, and root disk reservation r3. If process 104 is in the same reservation domain, /proc/104/rdom would have the same contents. The reservation domain of the current process is named /proc/curproc/rdom.

The reservation domain of processes spawned by a process pid is given by the new file /proc/pid/crdom (where crdom stands for "child reservation domain"). When a child is forked, its rdom and crdom files are initialized to the contents of the parent's crdom file. File /proc/pid/crdom is writable by any process with the same effective user identifier as that of process pid, or by a super user. Writing into crdom files is checked for consistency and may fail, i.e., for each root reservation r in /proc/pid/rdom, /proc/pid/crdom must contain an internal reservation r that is equal to or descends from r.

As previously noted in conjunction with FIG. 1, Eclipse/BSD tags every request with the queue used for that request. Resource reservations often cannot simply be associated with shared objects because different clients' requests may specify the same object but different queues. For example, two processes may be in different reservation domains and each may need to use a different disk queue to access a shared file, or a different network output link queue to send packets over a shared socket. It would be difficult to compound reservations used on the same object correctly if reservations were associated with the object, because then one client could benefit from another client's reservations. Therefore, in accordance with the invention, Eclipse/BSD queues are associated with references to shared objects, rather than the shared objects themselves (e.g., process, memory object, vnode (virtual node), socket, etc.).

In the case of input/output (I/O) objects, such as vnodes and sockets, each file descriptor that refers to the object also contains a pointer to a queue. Eclipse/BSD copies that queue pointer to the I/O requests issued on that file descriptor. Note that file descriptors can be private, even if the referred object is not. The file descriptor's queue pointer is initialized to the process's default queue for the respective device: for vnodes, at open time; for connected sockets, at connect or accept time; for unconnected sockets, at send to or sendmsg time. However, a fcntl system call gets the following two additional commands: F_QUEUE_SET, for setting a file descriptor's pointer to a different queue, and F_QUEUE_GET, for obtaining the name of the queue to which a file descriptor points.

Each resource reservation r has a reference count. The file descriptor of r's share file points to r; additionally, rdom and crdom files and various file descriptors may refer to r, as explained in the previous paragraphs. If r's reference count falls to zero and r's garbage collection flag GC is set (default), Eclipse/BSD garbage collects r. Privileged processes can use new commands to the fcntl system call, F_COLLECT_SET or F_COLLECT_GET, to set or get a resource reservation's GC flag.

The manner in which Eclipse/BSD supports QoS requirements will now be described in greater detail. As noted above, Eclipse/BSD applications obtain QoS guarantees by requesting resource reservations. Such resource reservations usually should not be attributes of shared objects, such as files and sockets, because each reference to the object may need to use its own, possibly different reservation. However, the QoS requirements of a shared object often are well defined in the form of resource requirements. This is particularly true for media streams, e.g., the data rate for digital audio or video strips often is well-known or can be easily bounded.

In Eclipse/BSD, files get a new attribute, resource_req, that specifies the file's nominal data rate, in Kbps. For example, a file containing a video strip might have resource_req equal to 1500 (that is, 1.5 Mbps).

Eclipse/BSD stores resource_req in the file's inode (a data structure that describes the contents of a file). Applications use two new commands to the fcntl system call, F_RREQ_SET and F_RREQ_GET, to set or get a file's resource_req, respectively. The permissions necessary for these commands are the same as those for writing or reading the file, respectively. A new utility, chrreq, uses these commands to make it possible to set or get a file's resource_req from the shell.

For distributed file systems to be able to set or get resource_req, the client/server protocol used may need to extended, either by introducing new request types or by adding resource_req to the file attributes that are transferred in existing request types. For example, in network file system (NFS), as described in M. McKusick, K. Bostic, M. Karels and J. Quarterman, "The Design and Implementation of the 4.4 BSD Operating System," Addison Wesley Pub. Co., Reading, Mass., 1996, the client could invoke either new procedures or new versions of the existing GETATTR and SETATTR procedures. Eclipse/BSD uses the latter, but if an Eclipse/BSD NFS client receives an error indication from a legacy NFS server, the client reverts to the standard versions of the existing GETATTR and SETATTR procedures.

Eclipse/BSD includes a new command for the fcntl system call, F_QUEUE_CREATE_AND_SET, that, applied to a file descriptor fd that references a local file f, (1) automatically creates a new disk queue whose share matches f's requirements, and (2) sets fd 's queue pointer to that queue. The command's argument specifies whether the file will be read and/or written. If f's resource_req is null, no queue is created and an error is returned; otherwise, the new queue is created as a child of the process's root reservation for the device where the file is located. If the queue's share cannot be set according to resource_req, due to admission control, then share is closed (causing the queue to be garbage collected) and an error is returned. Otherwise, fd's queue pointer is set to the new queue, share is closed, and a success indicator is returned. Because fd's queue pointer is the only remaining reference to the new queue, that queue will be automatically garbage collected when the application closes fd.

If, on the other hand, file descriptor fd references a remote file f, then F_QUEUE_CREATE_AND_SET requires queues that match f's requirements to be created at the server's disk and client and server network interfaces. Client queues and, for stateful distributed file systems, also server queues, can be created analogously to the local case, described above. However, stateless distributed file systems, such as NFS, require ephemeral server queues, which are garbage collected by timeout, instead of when f is closed. In such cases, F_QUEUE_CREATE_AND_SET sets fd's QCS ("queue create and set") flag (which by default is not set). If fd's QCS flag is set, Eclipse/BSD uses new versions of NFS's READ and WRITE procedures for I/O through fd. Requests in the new versions include not only the file handle, returned by the server, but also the process identifier of the client process.

Figure 3:
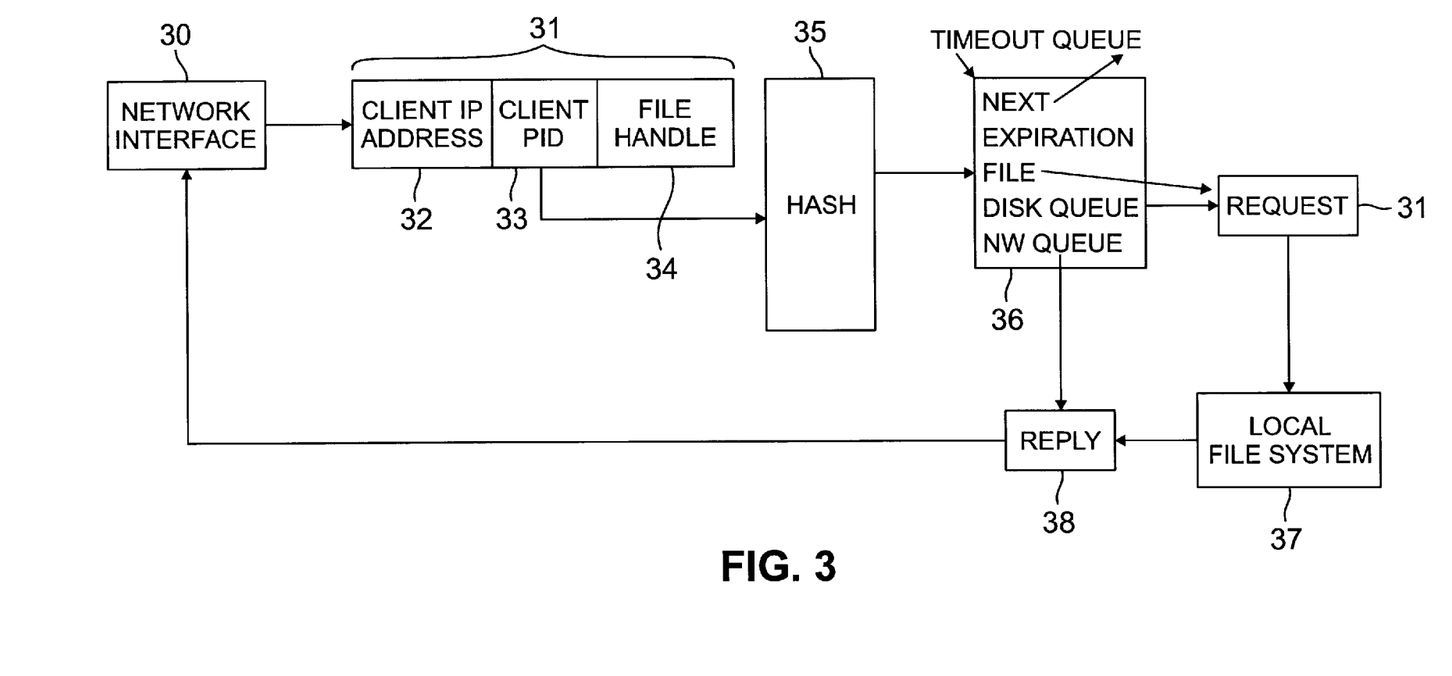
FIG. 3 illustrates the operation of a network file system (NFS) server that uses ephemeral descriptors to keep track of queues created for accessing and transmitting files with the required resources, in the illustrative embodiment of the invention.

FIG. 3 illustrates the operation of an NFS server that uses ephemeral descriptors to keep track of queues created for accessing and transmitting files with the required resources, in accordance with the invention. The FIG. 3 diagram includes a network interface 30 which receives a request 31. When an Eclipse/BSD NFS server receives the request 31, the server applies a hash function 35 to the client IP address 32, client process identifier (pid) 33, and file handle 34, in order to determine an ephemeral descriptor 36. The ephemeral descriptor 36 contains pointers to the file, and to a disk queue and a network interface queue matching the file's requirements. As shown in FIG. 3, the server uses the disk queue referenced by the ephemeral descriptor 36 in accesses to the file by the respective client, and generates a reply 38 that may contain data retrieved from the local file system 37 and uses the network interface queue referenced by the ephemeral descriptor 36.

Ephemeral descriptors in accordance with the invention also contain an expiration time and are linked in a timeout queue. Each time a request hashes to an ephemeral descriptor, that descriptor's expiration is extended. When current time exceeds a descriptor's expiration time, the descriptor's referenced queues and the descriptor itself are garbage collected. On the other hand, if a given request does not hash to any existing descriptor, the server allocates a new descriptor, creates new disk and network interface queues matching the accessed file's requirements, and makes the new descriptor point to the file and the new queues.

Eclipse/BSD does not make F_QUEUE_CREATE_AND_SET implicit in every open call because, in some cases, a file's resource requirements are irrelevant. For example, when a file is being copied, it does not require any particular data rate, even if the file contains a video strip.

As described above, an Eclipse/BSD application, after opening a local or remote file, can use a new fcntl command, F_QUEUE_CREATE_AND_SET, to guarantee the required resources for accessing the file. It will now be described how the Eclipse/BSD operating system configured in accordance with the invention can utilize this new command to support legacy applications, i.e., applications existing before the command was developed.

Support of legacy applications in the Eclipse/BSD operating system is provided in the illustrative embodiment of the invention by allowing users to interpose a requirement broker between a legacy application and the operating system. Such a broker intercepts certain system calls and automatically establishes resource reservations according to resource requirements. Requirement brokers that are used by many applications may be implemented by modifying the system's existing libc library, which is dynamically linked with applications at load time. Users may set environment variables to enable or disable brokers implemented within libc. On the other hand, a requirement broker for a specific application, e.g., an application /path/app, may be implemented by redefining intercepted system calls in a new library, e.g., /path1/libapp. so, that is dynamically pre-linked with /path/app before libc. A user may cause such pre-linking by moving /path/app to /path/app.leg and defining a new script /path/app:

!/bin/sh
LD_PRELOAD=/path1/libapp.so /path/app.leg $*

In the illustrative embodiment, Eclipse/BSD's file system broker is implemented by modifying libc and is enabled by environment variable AUTO_FILE_RESERV. This broker intercepts only open calls; if the call is successful, the broker invokes fcntl F_QUEUE_CREATE_AND_SET. The file system broker therefore causes even unmodified existing applications to access local or remote files automatically with the required reservations.

A network broker can also be defined for each application-level client/server protocol (e.g., HTTP). Network brokers typically are implemented by specific pre-linked libraries and usually must intercept more system calls than do file system brokers. Network brokers may need to intercept socket, connect, accept, and close system calls so as to maintain a list of the process's open sockets and their state. They may also need to intercept write, send, sendto, sendmsg, read, recv, recvfrom, and rcvmsg calls on sockets in order to eavesdrop on requests and replies and keep track of what files are being accessed over what sockets. If the protocol supports only whole-file transfers, file access begins with a request and ends with the corresponding reply. Otherwise, in stateful protocols, access to a file may begin with an open request and end with a close request; in stateless protocols, access to a file may begin with a fetch or store request and may be presumed to have ended a certain timeout after the last fetch or store request.

When network access to a file begins, the network broker consults the file's resource requirements and creates a queue of matching share as a child of the process's root reservation for the respective network interface. The broker may invoke fcntl F_SHARE_WAIT to block until the required share is obtained. The broker sets to the new queue the queue pointer of the file descriptor fd used to send or receive the file. The broker also closes share, so that fd's is the only reference to the new queue. When access to the file ends, the broker closes fd, causing the queue to be garbage collected.

If multiple files are accessed over the same socket, the network broker may need to dup the socket's file descriptor for each file. Each duped descriptor can point to a queue with the respective file's required resources. The broker then converts between original and duped descriptors on each fetch or store request or reply on a file.

It should be noted that network brokers need not be complex. For example, the network broker for ftpd (Eclipse/ BSD's FTP server daemon) intercepts the read, open, connect, and close system calls. The broker monitors read calls on the control socket to detect RETR filename (retrieve) and STOR filename (store) commands from the client. In such cases, the broker records the file name and corresponding resource requirements. At the subsequent open and connect calls, respectively, the broker creates and sets disk and network queues matching the requirements. The broker destroys those queues at the subsequent close call.

The above file system and network brokers ignore CPU and memory requirements. More sophisticated brokers may adjust the application's CPU and memory reservations in accordance with CPU and memory requirement templates, which can be static or dynamic. A static template gives for each application the required CPU (in SPECint95) and memory (in KB), regardless of file accesses. A dynamic template gives, for each application and name extension of a file accessed by the application, the additional CPU and memory requirement. Additional requirements are the sum of a fixed term and the product of a variable term and the accessed file's resource_req. CPU and memory requirement templates may be experimentally determined and maintained by the system administrator.

As described above, requirement brokers in accordance with the invention act on behalf of legacy applications to automatically create queues that match the resource requirements of accessed files. Such queues are children of the application's root reservations. It will now be described how users can set an application's reservation domain (i.e., the root reservations) from a shell.

Eclipse/BSD as configured in the illustrative embodiment of the invention provides a new utility, newreserv, for creating a new internal reservation that is a child of a named internal reservation. The created internal reservation is not garbage collected when the utility exits because the utility has set-user-id mode set and runs as a privileged process, which can use fcntl F_COLLECT_SET to prevent a resource reservation's garbage collection. The newreserv utility prints the name of the new internal reservation.

Before using newreserv, users will typically need to invoke ps to determine the shell's process id, s, and then find the shell's reservation domain by invoking cat /proc/s/rdom. Given the shell's root reservations, users can then create new internal reservations using newreserv. To set the share of resource reservation b of resource a, users may invoke cat>/reserv/a/b/share. Finally, users can use cat>/proc/s/crdom to set the shell's crdom file to a list of internal reservations that are equal to or descend from the shell's root reservations. Applications will be started from the shell with reservation domain (rdom) equal to the shell's crdom file.

Figure 4:
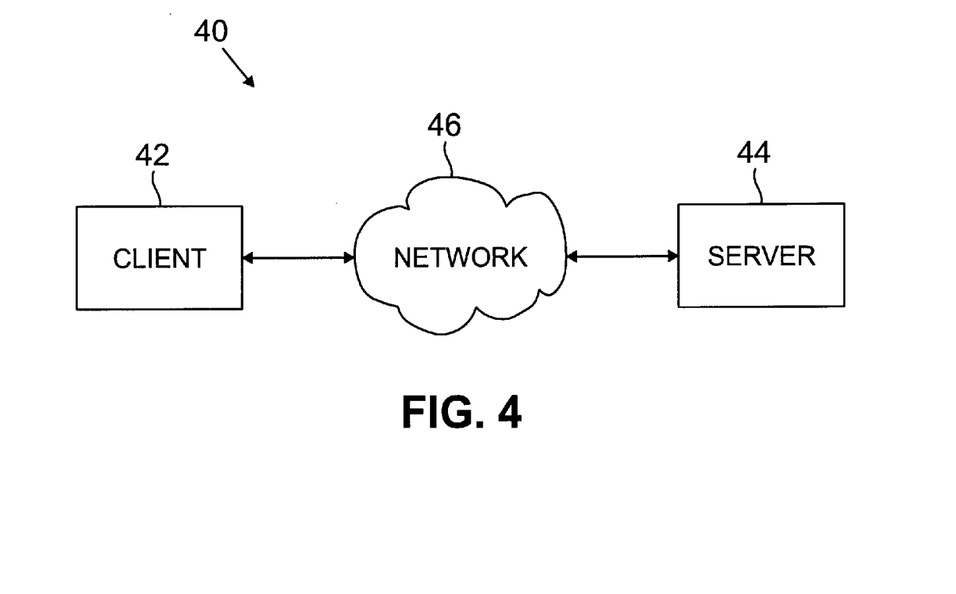
FIG. 4 shows an example of a computer network in which the invention may be used.

FIG. 4 shows an exemplary computer network 40 in which the invention may be used. The network 40 includes a client 42 and a server 44, both of which are connected to communicate over a network 46. The network 46 may represent a local area network, a metropolitan area network, a wide area network, a global data communications network such as the Internet, a private "intranet" or "extranet" network, as well as portions or combinations of these and other data communication media.

Figure 5:
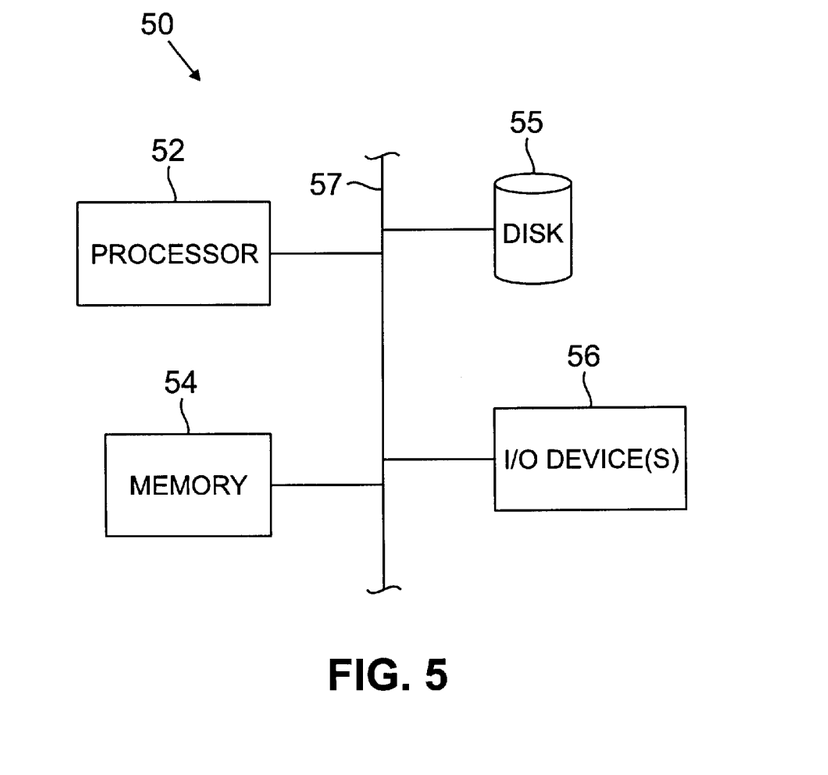
FIG. 5 shows a more detailed view of a given one of the hosts in the network of FIG. 4.

FIG. 5 shows a more detailed view of a computer 50 which may correspond to client 42 or server 44 in the network of FIG. 4. The computer 50 includes a processor 52, a memory 54, a disk-based storage device 55, and one or more input/output (I/O) devices; 56, and may represent, e.g., a desktop or portable personal computer, a palmtop computer, a personal digital assistant (PDA), a micro or mainframe computer, a workstation, etc. The above-noted elements of the computer 50 communicate over a communication medium 57 which may be implemented as, e.g., a bus, a network, a set of interconnections, as well as portions or combinations of these and other media. The processor 52 may be implemented as a CPU, a microprocessor, an application-specific integrated circuit (ASIC) or other digital data processor, as well as various portions or combinations thereof. The memory 54 is typically an electronic memory, such as a random access memory (RAM) associated with the processor 52. The disk-based storage device 55 may be an external magnetic or optical disk memory, a magnetic tape memory, or other suitable data storage device.

FIGS. 6–9 show experimental results that demonstrate that the above-described brokers implemented in Eclipse/BSD work as expected both in local and in remote file accesses, automatically reserving resources according to the file requirements. The experiments were performed on a network configured as shown in FIG. 4, between a pair of PCs interconnected by a lightly-loaded Ethernet at 100 Mbps. One of the PCs was designated as a server, the other as a client. Both PCs ran either a conventional FreeBSD 2.2.8 operating system or an Eclipse/BSD operating system configured in accordance with the invention. The server PC had a 266 MHz Pentium II CPU, 64 MB RAM, and a 9 GB SCSI disk. The client PC had a 133 MHz Pentium CPU, 32 MB RAM, and a 4.3 GB IDE disk.

An initial series of experiments tested the NFS extensions and file system broker. In these experiments, applications A, B, C, and D simultaneously read different 100 MB files $f_A, f_B, f_C$, and $f_D$, respectively, with QoS bit rate requirements of 2.4, 1.8, 1.2, and 0.6 Mbps, respectively. Applications ran either all on the client PC or all on the server PC; files remained always on the disk of the server PC. To prevent cache effects, applications read very large unrelated files before each experiment. There was no other load on the PCs. To ensure repeatable and nearly worst-case conditions, sectors of each file were perfectly interleaved on the disk.

Figure 6:
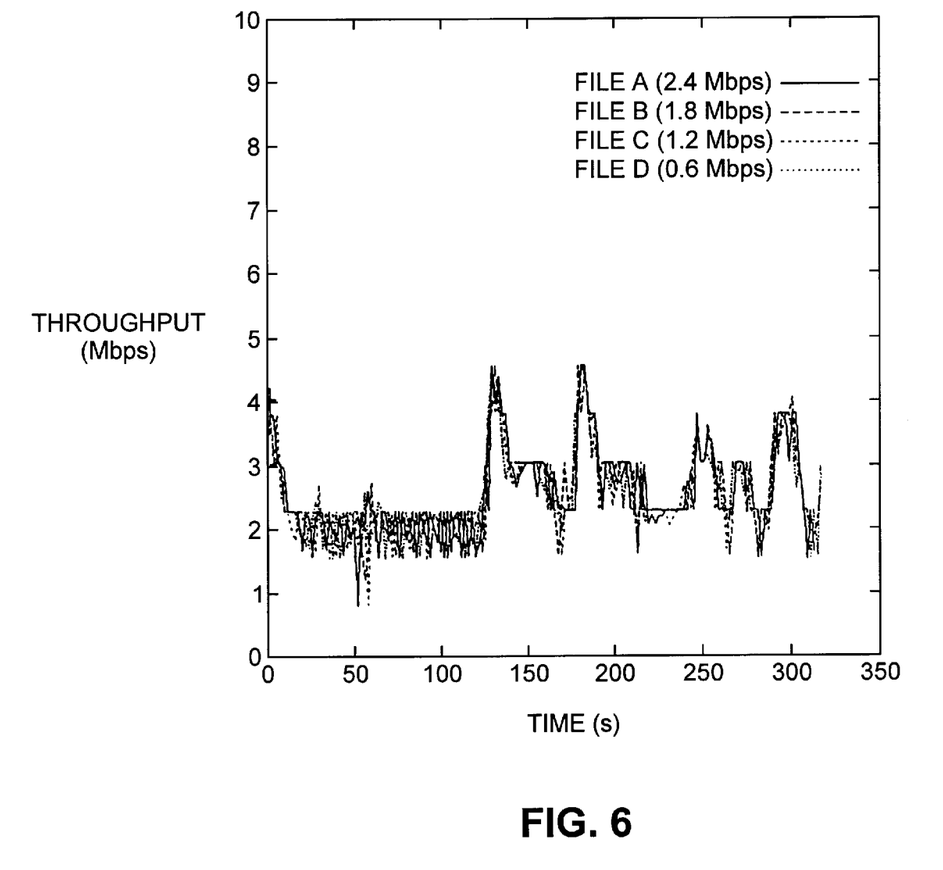
FIGS. 6 through 9 are plots illustrating the performance advantages provided by the illustrative embodiment of the invention.
Figure 7:
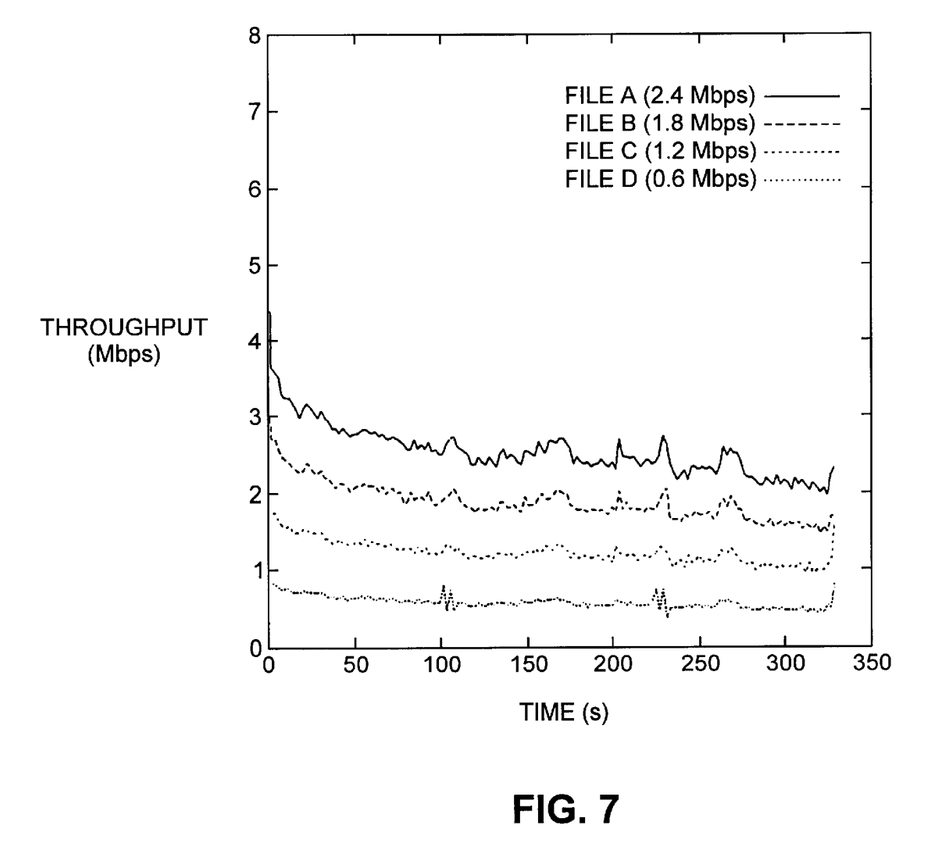

FIGS. 6 and 7 show the throughput obtained by each application when the applications ran on the server PC (local file access) using conventional FreeBSD and Eclipse/BSD with the file system broker, respectively. The figures show that FreeBSD has much higher throughput variance and that Eclipse/BSD's file system broker automatically and correctly discriminates the different file requirements.

Figure 8:
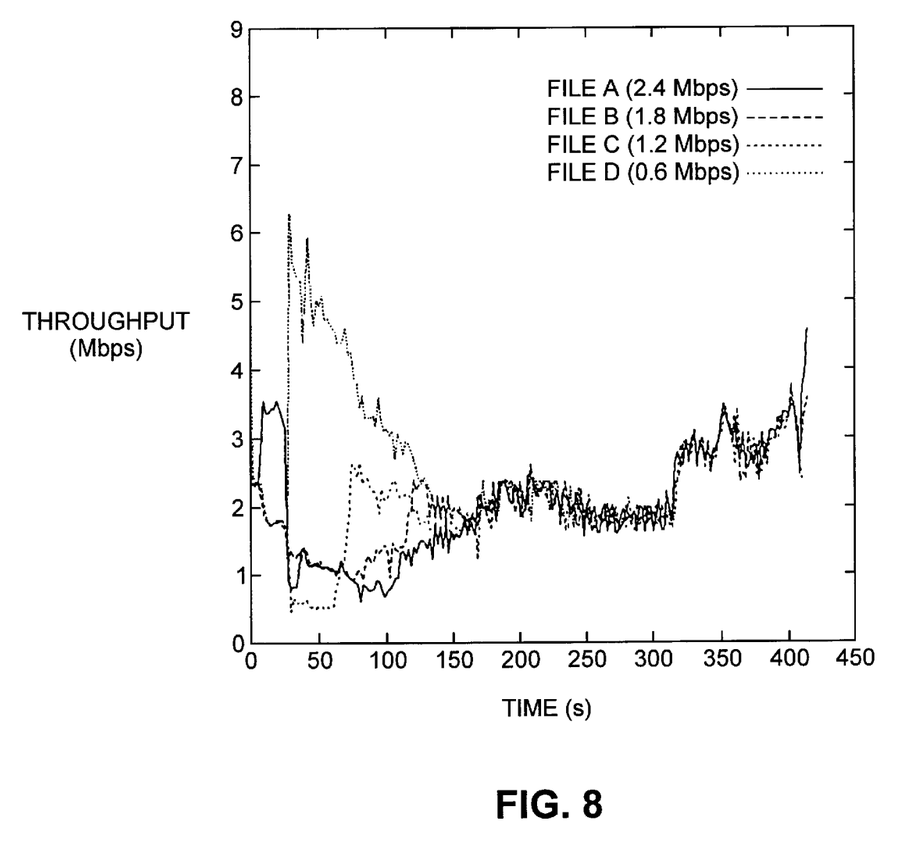
Figure 9:
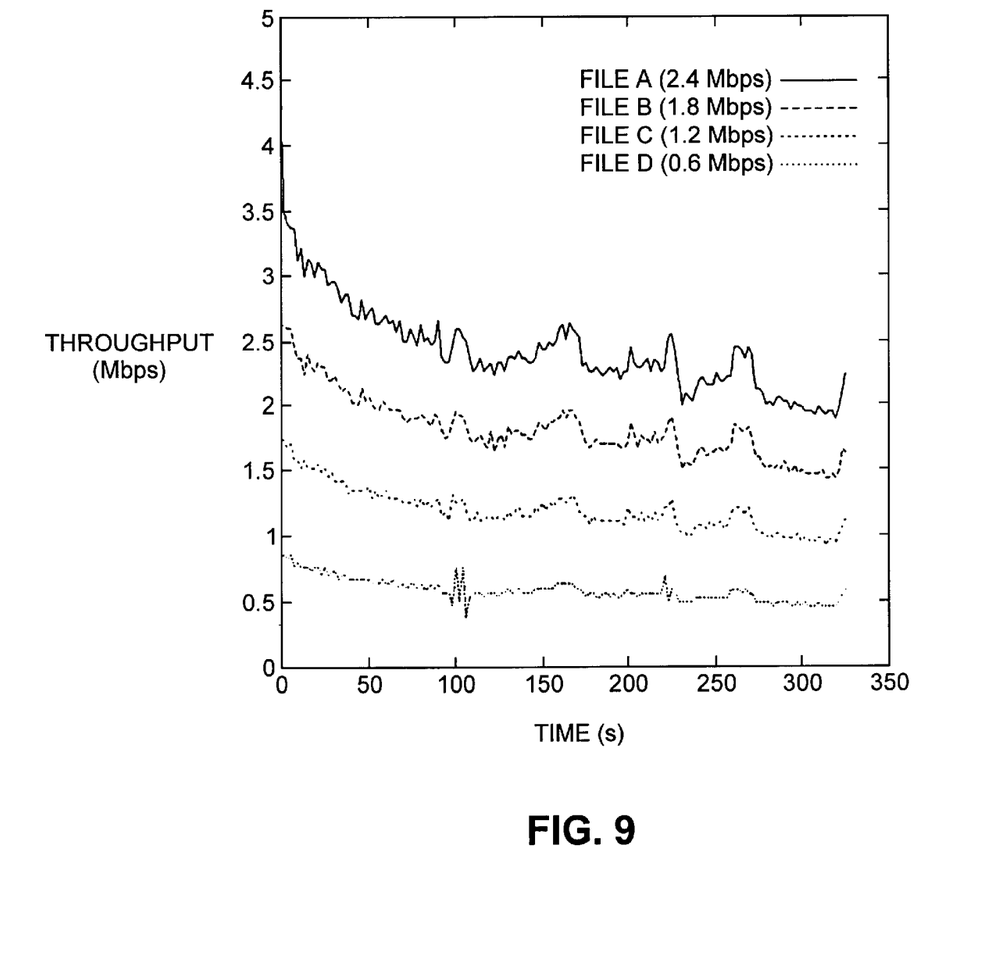

FIGS. 8 and 9 show similar results for a case in which the applications ran on the client PC (remote file access) using conventional FreeBSD and Eclipse/BSD with the file system broker, respectively. It can be seen that the conventional FreeBSD does not discriminate the applications, giving too little or too much bandwidth to different applications at different times. In contrast, Eclipse/BSD's file system broker automatically gives to each application the required performance.

It should noted that the decaying absolute throughputs shown in FIGS. 7 and 9 are attributable to gradual increases in seek overheads associated with the use in the illustrative embodiment of a disk scheduling algorithm that guarantees only proportional sharing of net disk bandwidth. It has been verified that absolute throughputs are nearly proportionally shared and constant if files are accessed randomly, such that seek overheads remain nearly constant.

A final experiment tested Eclipse/BSD's FTP broker. In this experiment, each of three FTP clients A, B, and C simultaneously retrieved large (>100 MB) files $f_A, f_B$ and $f_c$, respectively, with a QoS bit rate requirements of 3.6, 2.4, and 1.2 Mbps, respectively. The measurements in this case showed that Eclipse/BSD's FTP broker indeed caused each file to be transferred with the required bandwidth.

One possible alternative implementation of the invention involves associating resource_req with file type, instead of with individual files as in the illustrative embodiment. For example, the system could use a database that specifies that all files whose name has a certain extension have a corresponding resource_req. Such an embodiment would be less flexible than the illustrative embodiment described previously, since presumably only the system administrator would be able to change the database. On the other hand, a replicated database could make consulting a file's requirements faster, particularly in wide area networks.

Another possible alternative is to implement requirement brokers as SLIC extensions. SLIC allows interposition of kernel events, such as system calls and signals, by trusted kernel extensions, and is described in greater detail in D. Ghormley, D. Petrou, S. Rodrigues and T. Anderson, "SLIC: An Extensibility System for Commodity Operating Systems," Proc. Annual Tech. Conf., USENIX, June 1998. However, installation of the requirement brokers would then require intervention of the system administrator.

It should be emphasized that the exemplary techniques described herein are intended to illustrate the operation of the invention, and therefore should not be construed as limiting the invention to any particular embodiment or group of embodiments. For example, although illustrated herein using the FreeBSD operating system, the techniques of the invention can be used to provide similar improvements in other operating systems. These and numerous other alternative embodiments within the scope of the following claims will therefore be apparent to those skilled in the art.

What is claimed is:

1. A method of ensuring a particular quality of service (QoS) for an application in a computer system, the method comprising the steps of:

associating a QoS requirement attribute with each of a plurality of files accessible to the application; and implementing a requirement broker between the application and an operating system of the computer system, wherein the requirement broker intercepts one or more designated system calls and automatically requests from the system QoS guarantees in accordance with the QoS requirement attributes of files accessed by the application.

2. The method of claim 1 wherein the application is a legacy application existing prior to the development or modification of an application programming interface for requesting QoS guarantees from the system.

3. The method of claim 1 wherein all files having a name which matches a certain pattern have a corresponding QoS requirement attribute.

4. The method of claim 3 wherein the associations between file name patterns and QoS requirements are represented by a database.

5. The method of claim 1 wherein the QoS requirements are in the form of resource requirements and the QoS guarantees are in the form of resource reservations.

6. The method of claim 5 wherein the resource comprises at least one of a processor resource, a memory resource, a disk resource, and a network interface resource.

7. The method of claim 5 wherein a resource reservation specifies a portion of a resource set aside for exclusive use by one or more processes.

8. The method of claim 1 wherein the requirement broker is implemented at least in part in the form of a modified version of a library that is dynamically linked with the application at load time.

9. The method of claim 1 wherein the operating system comprises a Unix-derived operating system.

10. The method of claim 1 wherein the operating system comprises an operating system not derived from Unix.

11. The method of claim 1 wherein the operating system is configured to support a command that, when applied to a file descriptor fd that references a local file f (i) automatically creates a queue whose share of the bandwidth of the device where f is located matches f's resource requirement attribute, and (ii) adds a reference from fd to the created queue.

12. The method of claim 11 wherein the command includes an argument specifying whether the file will be read or written.

13. The method of claim 11 wherein the new queue is created as a child of the process's root reservation for the device where the file is located.

14. The method of claim 1 wherein the operating system is configured to support a command that, when applied to a file descriptor fd that references a remote file f of a stateful distributed file system, (i) automatically creates client and server queues whose share of the bandwidth of each device used for accessing f matches f's resource requirement attribute, and (ii) modifies client and server state so that f's client and server queues are automatically destroyed when f is closed.

15. The method of claim 14 wherein the command includes an argument specifying whether the file will be read or written.

16. The method of claim 14 wherein client queues are created as children of the client process's root reservation for the devices used in file accesses, and server queues are created as children of the server process's root reservation for the devices used in file accesses.

17. The method of claim 1 wherein the operating system is configured to (i) on a first command from a given client process to input or output data from or to a remote file f of a stateless distributed file system, automatically create client and server queues whose share of the bandwidth of each device used for accessing f matches f's resource requirement attribute; (ii) use the created queues in subsequent commands from the given client process to input or output data from or to f, and (iii) automatically destroy the created queues when the given client process within a certain time interval issues no command to input or output data from or to f.

18. The method of claim 17 wherein client queues are created as children of the client process's root reservation for the devices used in file accesses, and server queues are created as children of the server process's root reservation for the devices used in file accesses.

19. The method of claim 17 wherein step (i) is contingent on the state of a flag attribute of the file f or of the corresponding file descriptor fd, and wherein the operating system is configured to support a command for changing the state of the flag.

20. The method of claim 17 wherein step (i) adds references from fd to the created client queues.

21. The method of claim 1 wherein the requirement broker comprises a file system broker which intercepts system calls relating to file access so as to ensure that the application can access the files automatically with the required resource reservations.

22. The method of claim 1 wherein the requirement broker comprises a separate network broker defined for each application-level client/server protocol required by the application.

23. An apparatus for ensuring a particular quality of service level for an application in a computer system, the apparatus comprising:

a processor operative to support an operating system of the computer system, the operating system being operative to associate a QoS requirement attribute with each of a plurality of files accessible to the application, and to implement a requirement broker between the application and the operating system, wherein the requirement broker intercepts one or more designated system calls and automatically requests from the system QoS guarantees in accordance with the QoS requirement attributes of files accessed by the application; and a memory coupled to the processor and operative to store at least a subset of the associated QoS requirement attributes.

24. An article of manufacture comprising a machine-readable medium for storing one or more programs for ensuring a particular quality of service level for an application in a computer system, wherein the one or more programs when executed implement the steps of:

associating a QoS requirement attribute with each of a plurality of files accessible to the application; and implementing a requirement broker between the application and an operating system of the computer system, wherein the requirement broker intercepts one or more designated system calls and automatically requests from the system QoS guarantees in accordance with the QoS requirement attributes of files accessed by the application.

25. An apparatus for use in a computer system, the apparatus comprising:

a processor-implemented operating system operative to associate a QoS requirement attribute with each of a plurality of files accessible to the application, and to implement a requirement broker between the application and the operating system, wherein the requirement broker intercepts one or more designated system calls and automatically requests from the system QoS guarantees in accordance with the QoS requirement attributes of files accessed by the application.

* * * * *